United States Patent
Pellikka (10) Patent No.: US 10,123,128 B2
(45) Date of Patent: Nov. 6, 2018

(54) SPEAKER ARRANGEMENT

(71) Applicant: Microsoft Technology Licensing, LLC, Redmond, WA (US)

(72) Inventor: Matti Pellikka, Lempäälä (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/258,997

(22) Filed: Sep. 7, 2016

(65) Prior Publication Data
US 2018/0070183 A1   Mar. 8, 2018

(51) Int. Cl.
| | |
|---|---|
| H04R 25/00 | (2006.01) |
| H04R 17/10 | (2006.01) |
| H04R 29/00 | (2006.01) |
| H04R 3/04 | (2006.01) |
| B06B 1/06 | (2006.01) |
| H04M 1/03 | (2006.01) |
| H04R 7/04 | (2006.01) |

(Continued)

(52) U.S. Cl.
CPC .......... *H04R 17/10* (2013.01); *B06B 1/0614* (2013.01); *H04M 1/03* (2013.01); *H04R 3/04* (2013.01); *H04R 7/045* (2013.01); *H04R 17/00* (2013.01); *H04R 29/001* (2013.01); H04M 1/0266 (2013.01); H04R 1/24 (2013.01); H04R 7/10 (2013.01); H04R 2217/01 (2013.01); H04R 2400/03 (2013.01); H04R 2430/03 (2013.01); H04R 2440/05 (2013.01); H04R 2499/11 (2013.01)

(58) Field of Classification Search
CPC ........ H04R 17/10; H04R 3/04; H04R 29/001; H04R 2217/01; H04R 2499/11
See application file for complete search history.

(56) References Cited

U.S. PATENT DOCUMENTS

| | | | |
|---|---|---|---|
| 6,130,773 A | 10/2000 | Jacobson et al. | |
| 7,016,659 B1 * | 3/2006 | Dorrough | H03C 1/00 332/149 |

(Continued)

FOREIGN PATENT DOCUMENTS

| | | |
|---|---|---|
| EP | 0969691 A1 | 1/2000 |
| GB | 2464117 A | 4/2010 |

(Continued)

OTHER PUBLICATIONS

Kim, et al., "High Performance Piezoelectric Microspeakers and Thin Speaker Array System", In Journal of ETRI, vol. 31, No. 6, Dec. 2009, pp. 680-687.

(Continued)

Primary Examiner — Tuan D Nguyen (57) ABSTRACT

According to one aspect, there is provided a speaker comprising a body, a surface structure rigidly attached to the body, electro-magnetic deformable plate elements attached to the rigid planar surface structure and configured to bend, when driven with voltage or current source, the surface structure, and electro-magnetic deformable plate element specific band-pass filter for at least one electro-magnetic deformable plate element of the electro-magnetic deformable plate elements, the band-pass filter having at least one electro-magnetic deformable plate element specific pass band.

20 Claims, 3 Drawing Sheets

(51) Int. Cl.
*H04R 17/00* (2006.01)
*H04M 1/02* (2006.01)
*H04R 1/24* (2006.01)
*H04R 7/10* (2006.01)

(56) References Cited

U.S. PATENT DOCUMENTS

| | | |
|---|---|---|
| 7,019,621 B2 | 3/2006 | Woodard et al. |
| 8,094,843 B2 | 1/2012 | Eaton |
| 8,594,346 B2 | 11/2013 | Kwan et al. |
| 9,031,265 B2 | 5/2015 | Fukushima et al. |
| 2004/0233174 A1 | 11/2004 | Robrecht et al. |
| 2005/0185809 A1 | 8/2005 | Bianchini |
| 2009/0156273 A1 | 6/2009 | Romesburg et al. |
| 2009/0267902 A1 | 10/2009 | Nambu et al. |
| 2010/0225600 A1* | 9/2010 | Dai .................. G06F 3/016 345/173 |
| 2011/0128245 A1 | 6/2011 | Andoh et al. |
| 2012/0057728 A1 | 3/2012 | Fujise et al. |
| 2012/0289162 A1* | 11/2012 | Hosoi ............... H04R 25/606 455/41.3 |

FOREIGN PATENT DOCUMENTS

| | | |
|---|---|---|
| GB | 2517721 A | 3/2015 |
| WO | 2012052803 A1 | 4/2012 |

OTHER PUBLICATIONS

"International Search Report and Written Opinion Issued in PCT Application No. PCT/US2017/048778", dated Nov. 2, 2017, 14 Pages.

* cited by examiner

SPEAKER ARRANGEMENT

BACKGROUND

An electronic device usually includes a speaker or speakers to enable audio output to a user of the electronic device. Depending on the device, the size needed by the speaker may be significant. On other hand, a mobile electronic device, for example, a smart phone sets certain restrictions to the structure and especially to the overall size and thickness of the speaker. Further, audio quality provided by the speaker needs to be sufficient depending on the electronic device in question.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a speaker is provided. The speaker comprises a body, a surface structure rigidly attached to the body, and electro-magnetic deformable plate elements attached to the surface structure and configured to bend, when driven with voltage or current source, the surface structure, and an electro-magnetic deformable plate element specific band-pass filter for at least one electro-magnetic deformable plate element of the electro-magnetic deformable plate elements, the band-pass filter having at least one electro-magnetic deformable plate element specific pass band.

In another embodiment, an electronic apparatus is provided. The electronic apparatus comprises body, a display structure rigidly attached to the body, electro-magnetic deformable plate elements attached to the display structure and configured to bend the display structure when driven with voltage or current source, and an electro-magnetic deformable plate element specific band-pass filter for at least one electro-magnetic deformable plate element of the electro-magnetic deformable plate elements, the band-pass filter having at least one electro-magnetic deformable plate element specific pass band.

In another embodiment, a method is provided. The method comprises inputting a series of audio frequencies to electro-magnetic deformable plate elements of the speaker, the speaker comprising a body, a surface structure rigidly attached to the body, and electro-magnetic deformable plate elements attached to the surface structure and configured to bend, when driven with a voltage or current source, the surface structure, measuring frequency response of the speaker to the input series of audio frequencies, and determining optimal pass-bands separately for each electro-magnetic deformable plate element based on the measurements.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

A surface structure, for example, a substantially rigid and planar surface structure may be used as an audio speaker, which is actuated by an electro-magnetic deformable plate element, for example, a piezoelectric or piezoceramic element, firmly attached underneath the surface structure. Such construction causes the surface structure to bend when a voltage difference across or a current through the electro-magnetic deformable plate elements is imposed. Since the surface structure is firmly attached from its edges and the surface structure is quite rigid compared to the moving element of a traditional speaker, for a thin electro-magnetic deformable plate element, a large surface area beneath the rigid planar surface structure needs to be covered with the electro-magnetic deformable material to attain enough bending moment to cause enough bending displacement, which generates the needed sound pressure for audible sound.

If the whole surface area of the surface structure is covered with a single electro-magnetic deformable plate element, this arrangement would suppress some of the natural vibrational modes (for example, eigenmodes) of the surface structure.

In at least some embodiments there is provided a speaker comprising a body and a surface structure rigidly attached to the body. The speaker further comprises electro-magnetic deformable plate elements attached to the surface structure and configured to bend, when driven with a voltage or current source, the surface structure, and an electro-magnetic deformable plate element specific band-pass filter for at least one electro-magnetic deformable plate element of the electro-magnetic deformable plate elements, the bandpass filter having electro-magnetic deformable plate element specific pass bands.

The utilization of most or all of the natural vibrational modes enables to attain a wide frequency response of large magnitude. When vibrational modes of the surface structure is taken into account in the placement of the at least one electro-magnetic deformable plate element, most of the natural vibrational modes of the surface structure are excited while still generating enough sound pressure across the whole audio frequency range.

In the following, although the term "a rigid and planar surface structure" or "a rigid and planar display structure" is used, the term "rigid structure" may refer to a substantially rigid structure that is still bendable by at least one electro-magnetic deformable plate element, for example, a piezo-electric deformable plate element attached to the surface structure to enable to use the surface structure as a speaker or a haptic engine. Further, the term "planar" may refer a substantially planar or slightly curved surface used, for example, in mobile devices.

Figure 1:
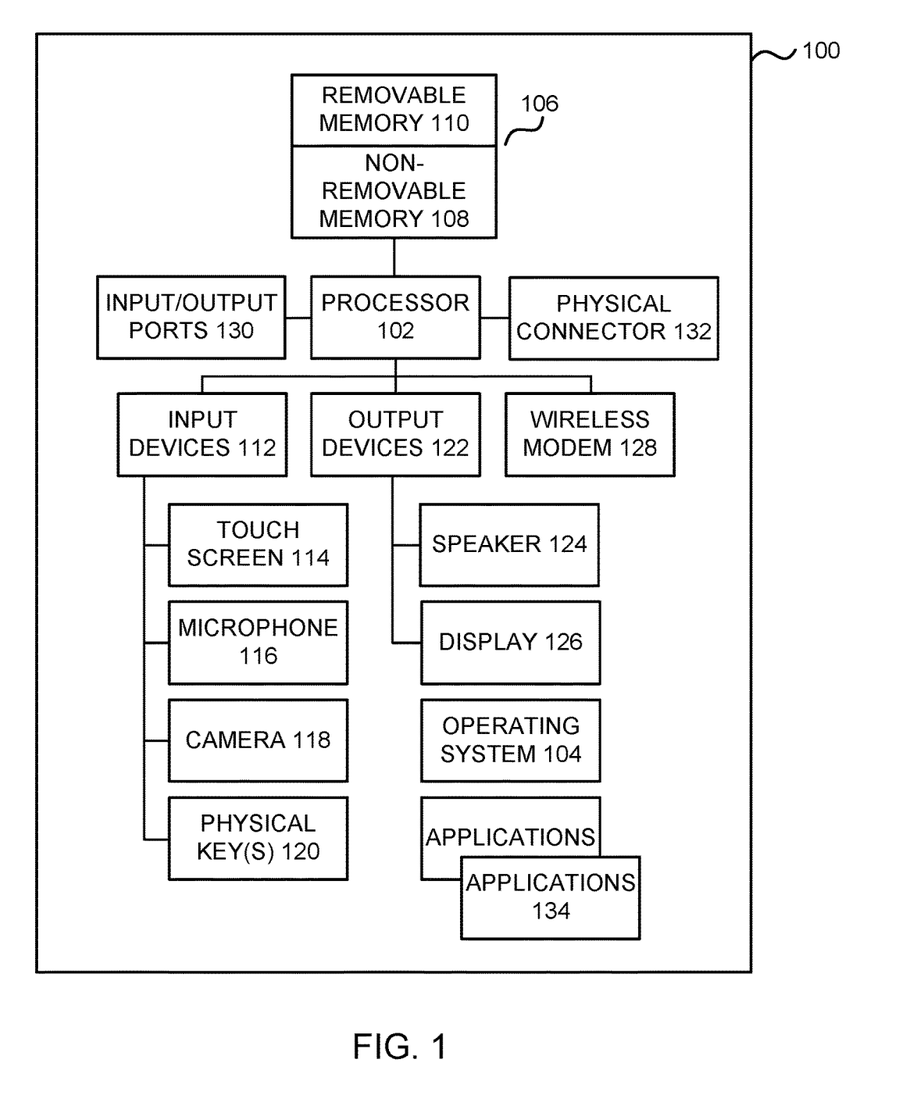
FIG. 1 is a system diagram depicting an apparatus including a variety of optional hardware and software components.

FIG. 1 is a system diagram depicting an electronic apparatus 100 including a speaker 124 and a variety of optional hardware and software components. The electronic apparatus 100 comprises a display structure and a body, where the display structure is rigidly attached to the body. Any components in the electronic apparatus 100 can communicate with any other component, although not all connections are shown, for ease of illustration. The apparatus 100 can be any of a variety of computing devices (for example, a cell phone, a smartphone, a handheld computer, a tablet computer, a laptop computer, a personal computer, a Personal Digital Assistant (PDA), a digital camera etc.).

The illustrated electronic apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components and support for one or more application programs 134. The application programs can include common mobile computing applications (e.g., email applications, calendars, contact managers, web browsers, messaging applications), or any other computing application.

The illustrated electronic apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 134. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The electronic apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 134 can comprise speech-recognition software as part of a voice user interface that allows a user to operate the electronic apparatus 100 via voice commands. Further, the electronic apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The electronic apparatus 100 can further include at least one input/output port 130 and/or a physical connector 132, which can be a USB port, a USB-C port, IEEE 1394 (FireWire) port, and/or RS-232 port. The illustrated components are not required or all-inclusive, as any components can be deleted and other components can be added.

Figure 2A:
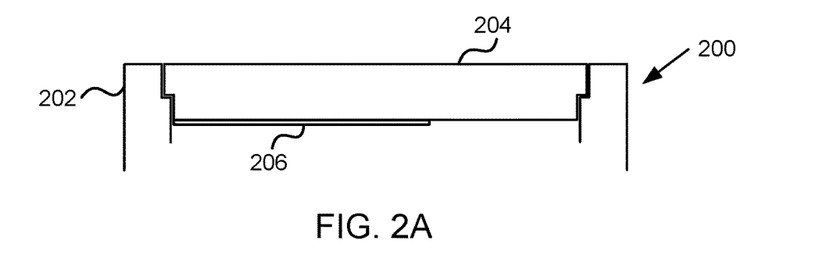
FIG. 2A illustrates a speaker according to one embodiment.

FIG. 2A illustrates a speaker 200 according to one embodiment. The speaker 200 comprises a body 202 to which a surface structure 204 is rigidly or firmly attached. The surface structure 204 may be a substantially rigid planar surface structure. The substantially rigid planar surface structure 204 refers, for example, to any material or structure that is, however, bendable in order to generate the needed sound pressure for audible sound. The surface structure 204 may comprise, for example, metal, plastic, wood, glass or a combination of these or some other materials. The surface structure 204 may also be a layered structure comprising multiple layers of different materials.

An electro-magnetic deformable plate element 206 is attached to the surface structure 204. The electro-magnetic deformable plate element 206, when driven with a voltage or current source, is configured to bend the surface structure 204. The electro-magnetic deformable plate element 206 is sized and placed to utilize multiple vibrational modes of the surface structure 204. In one embodiment, the electro-magnetic deformable plate element 206 is a piezoelectric or piezoceramic element. In one embodiment, thickness of the electro-magnetic deformable plate element 206 may be about 0.1 mm.

An optimal solution to generate enough sound pressure on the whole audio frequency range is not to cover the whole surface area with a single electro-magnetic deformable plate element, since that arrangement would suppress some of the natural vibrational modes (for example, eigenmodes) of the surface structure 204. The utilization of most of the natural vibrational modes is beneficial to attain wide frequency response of large magnitude. An optimal electro-magnetic deformable plate element arrangement excites most of the natural vibrational modes of the surface structure 204 while the electro-magnetic deformable plate element arrangement still covers most of the area to generate enough sound pressure across the whole audio frequency range.

Vibrational eigenmodes of a display structure or a surface structure govern the frequency response. For example, the eigenmodes of a rectangular plate of width a and height b, firmly attached from its edges, can be calculated with the following equation:

$$w_{m,n}(x, y) \approx \sin\left(\frac{m\pi x}{a}\right)\sin\left(\frac{n\pi y}{b}\right).$$

The corresponding eigenfrequencies be calculated with the following equation:

$$f_{m,n} \approx \left(\frac{m^2}{a^2} + \frac{n^2}{b^2}\right)\sqrt{\frac{D\pi^2}{4\rho h}},$$

$$D = \frac{h^3 E}{12(1-v^2)},$$

where rho is the plate mass density, h is the plate thickness, E is the plate Young's modulus, and nu is the plate Poisson's constant. The geometry of the excitation source determines which modes get excited.

Figure 2B:
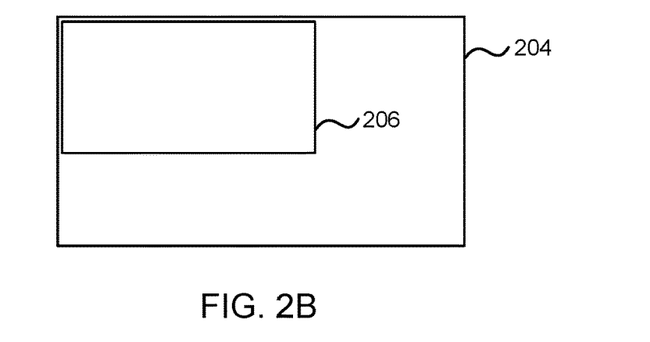
FIG. 2B illustrates location and size of an electro-magnetic deformable plate element of a speaker according to one embodiment.

FIG. 2B illustrates location and size of an electro-magnetic deformable plate element 206 of a speaker 200 according to one embodiment.

The electro-magnetic deformable plate element 206 is placed in a corner of the surface structure 204. In this embodiment, the size of the electro-magnetic deformable plate element 206 is approximately three-fifths of the height and width of the surface structure 204. Naturally, in other embodiments, other sizes can be used. Using this placement the electro-magnetic deformable plate element 206 is able to excite also the modes with even horizontal or vertical index, since the centermost quarter of the electro-magnetic deformable plate element 206, where the rigidity out-of-plane movement of the surface structure 204 is the least, is located either on a mode peak or pit.

Figure 2C:
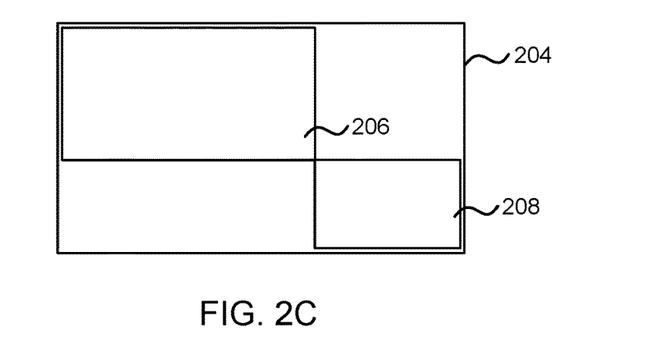
FIG. 2C illustrates locations and sizes of electro-magnetic deformable plate elements of a speaker according to one embodiment.

FIG. 2C illustrates locations and sizes of electro-magnetic deformable plate elements 204, 208 of a speaker 204 according to one embodiment.

In the embodiment of FIG. 2C, two electro-magnetic deformable plate elements are placed on the opposing corners of the surface structure 204. The electro-magnetic deformable plate element 206 acts as a main element similarly to in the embodiment illustrated in FIG. 2A, while the electro-magnetic deformable plate element 208 is used only with frequencies that would support the electro-magnetic deformable plate element 206 to excite the natural vibrational modes near those frequencies, most notably around the fundamental frequency.

In one embodiment, frequency selectivity of the electro-magnetic deformable plate element 208 is attained with a band-pass filter having one or more pass-bands. In another embodiment, a selectively 90 degree phase-shifting all-pass filter may be used to be able to enable the use of the electro-magnetic deformable plate element with most frequencies.

Figure 2D:
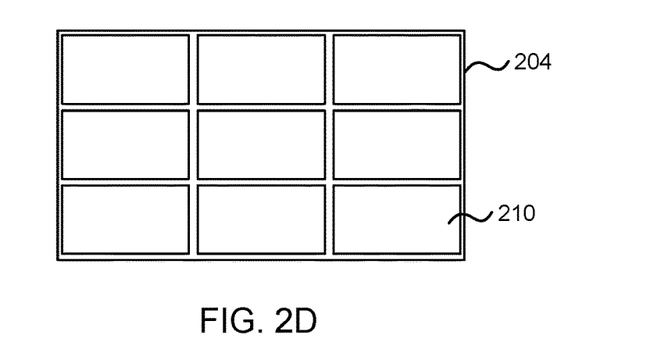
FIG. 2D illustrates locations and sizes of electro-magnetic deformable plate elements of a speaker according to another embodiment.

FIG. 2D illustrates example locations and sizes of electro-magnetic deformable plate elements 210 of a speaker according to another embodiment.

In the embodiment of FIG. 2D, the available area of the surface structure 204 is covered with multiple electro-magnetic deformable plate elements 210. FIG. 2D illustrates an embodiment where the electro-magnetic deformable plate elements 210 arranged in an m×n matrix setup. Each electro-magnetic deformable plate element 208 has its own band-pass filter. In one embodiment, the pass-bands have been chosen so that the magnitude of the frequency response across the audio frequency range would be maximized by exciting all the natural vibrational modes in an optimal manner. Each band-pass filter may have one or more pass-bands.

Although FIG. 2D illustrates that all the electro-magnetic deformable plate elements 208 are of identical size, their sizes may differ from each other depending, for example, on the surface structure 204 actually used and the usage purpose of the speaker 200.

Figure 2E:
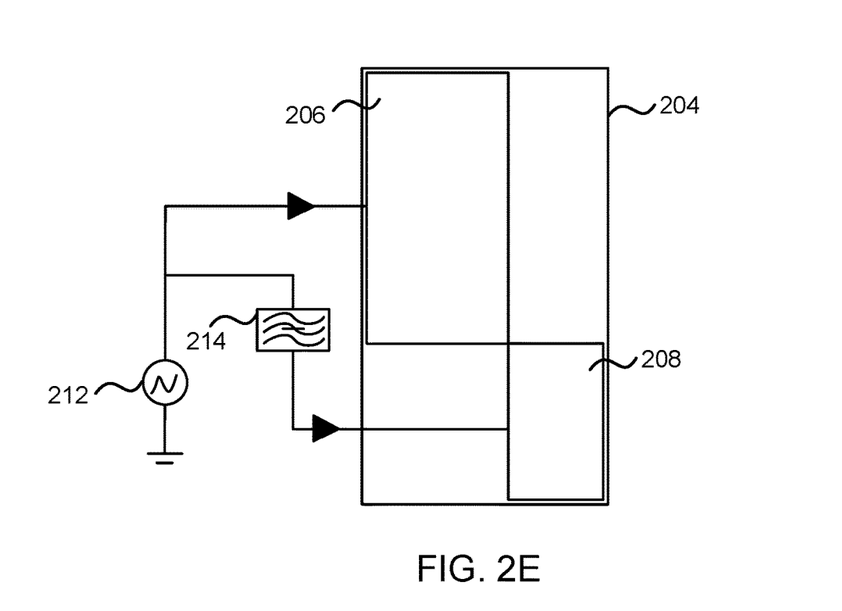
FIG. 2E illustrates an arrangement for operating electro-magnetic deformable plate elements of a speaker according to one embodiment.

FIG. 2E illustrates an arrangement for operating electro-magnetic deformable plate elements of a speaker according to one embodiment. The arrangement is illustrated using two electro-magnetic deformable plate elements 206 as already illustrated in FIG. 2C.

In this embodiment, the electro-magnetic deformable plate elements 206, 208 are placed on the opposing corners of the surface structure 204. The electro-magnetic deformable plate element 206 acts as a main element while the electro-magnetic deformable plate element 208 is used only with frequencies that would support the electro-magnetic deformable plate element 206 to excite the natural vibrational modes near those frequencies, most notably around the fundamental frequency.

Frequency selectivity of the electro-magnetic deformable plate element 208 is attained with a band-pass filter 214 with one or more pass-bands. Thus, when audio signals are generated with an audio signal generator 212, only a portion of the audio signals goes through the band-pass filter 214. Although FIG. 2E illustrates only two electro-magnetic deformable plate elements, more than two electro-magnetic deformable plate elements may be used.

Figure 3:
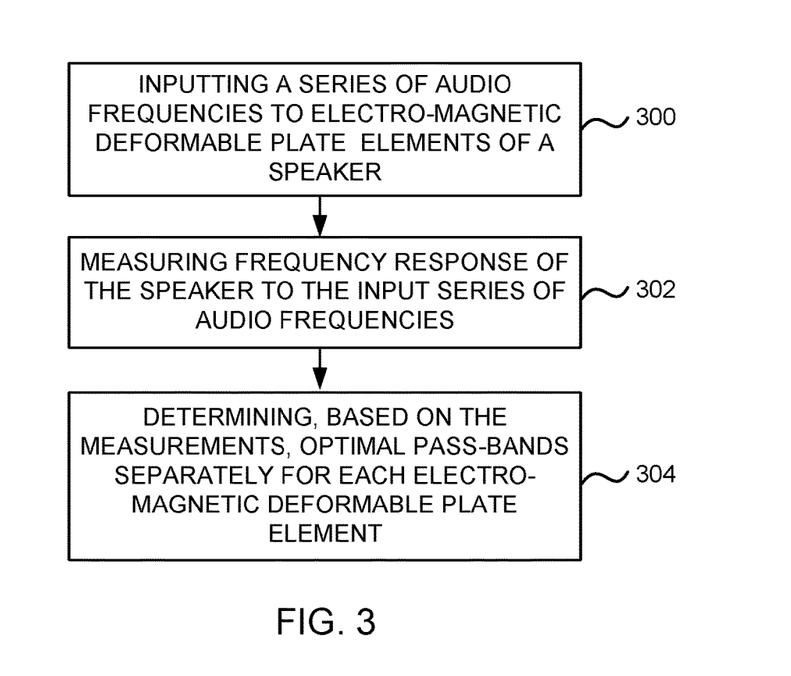
FIG. 3 illustrates a flow diagram of a method for determining frequency pass-bands for band-pass filters of electro-magnetic deformable plate elements according to one embodiment.

FIG. 3 illustrates a flow diagram of a method for determining frequency pass-bands for band-pass filters of electro-magnetic deformable plate elements of a speaker according to one embodiment. The method may be performed by an apparatus comprising at least one processor and at least one memory, where the at least one memory comprises instructions that, when executed by the at least one processor, cause the apparatus to perform the method.

The speaker may be a stand-alone speaker. Alternatively, a display structure of an electronic device may act as a speaker.

At 300 a series of audio frequencies is input to electro-magnetic deformable plate elements of the speaker. The speaker comprises a body, a surface structure rigidly attached to the body, and electro-magnetic deformable plate elements attached to the surface structure and configured to bend, when driven with a voltage or current source, the surface structure.

At 302 frequency response of the speaker to the input series of audio frequencies is measured. When characteristics (for example, the natural vibrational modes (eigenmodes) of the surface structure) of the surface structure are known, the frequency response reveals how well the input audio frequencies excite them.

At 304 based on the measurements optimal pass-bands are determined separately for each electro-magnetic deformable plate element. This means that desired pass-bands for each electro-magnetic deformable plate element can be identified separately for each electro-magnetic deformable plate element. Once the optimal pass-bands are known, these bands can be used as setting values for band-pass filters.

According to an aspect, there is provided a speaker comprising a body, a surface structure rigidly attached to the body, and at least one electro-magnetic deformable plate element attached to the surface structure and configured to bend, when driven with a voltage or current source, the surface structure, wherein the at least one electro-magnetic deformable plate element is sized and placed to utilize multiple vibrational modes of the surface structure.

In an embodiment, the speaker comprises a first substantially rectangular electro-magnetic deformable element attached to the surface structure, wherein the first electro-magnetic deformable plate element is placed in a corner of the surface structure so that at least part of the first electro-magnetic deformable plate element exceeds a center point of the surface structure.

In an embodiment, in any combination with any of the above embodiments, the size of the first electro-magnetic deformable plate element is approximately three fifths of the height and width of the surface structure.

In an embodiment, in any combination with any of the above embodiments, the speaker comprises a second substantially electro-magnetic deformable plate element attached to the surface structure, wherein the first and the second electro-magnetic deformable plate elements are placed in opposite corners of the surface structure so that they do not overlap with each other.

In an embodiment, in any combination with any of the above embodiments, the speaker comprises a band-pass filter comprising multiple pass-bands providing frequency selectivity of the second electro-magnetic deformable plate element.

In an embodiment, in any combination with any of the above embodiments, the speaker comprises a selectively 90 degree phase-shifting all-pass filter enabling to use the second electro-magnetic deformable plate element with most frequencies.

In an embodiment, in any combination with any of the above embodiments, the speaker comprises a plurality of electro-magnetic deformable plate elements arranged in a form of a matrix.

In an embodiment, in any combination with any of the above embodiments, the surface structure comprises a display structure.

In an embodiment, in any combination with any of the above embodiments, the electro-magnetic deformable plate element is a piezoelectric deformable plate element.

According to another aspect, there is provided a speaker comprising a body, a surface structure rigidly attached to the body, electro-magnetic deformable plate elements attached to the surface structure and configured to bend, when driven with a voltage or current source, the surface structure, and an electro-magnetic deformable plate element specific band-pass filter for at least one electro-magnetic deformable plate element of the electro-magnetic deformable plate elements, the band-pass filter having at least one electro-magnetic deformable plate element specific pass band.

In an embodiment, the speaker comprises a band-pass filter separately for each electro-magnetic deformable plate element of the electro-magnetic deformable plate elements, each band-pass filter having electro-magnetic deformable plate element specific pass bands.

In an embodiment, in any combination with any of the above embodiments, the electro-magnetic deformable plate elements are sized and placed to utilize multiple vibrational modes of the surface structure.

In an embodiment, in any combination with any of the above embodiments, the speaker comprises a first substantially rectangular electro-magnetic deformable element attached to the surface structure, wherein the first electro-magnetic deformable plate element is placed in a corner of the surface structure so that at least part of the first electro-magnetic deformable plate element exceeds a center point of the surface structure.

In an embodiment, in any combination with any of the above embodiments, the size of the first electro-magnetic deformable plate element is approximately three fifths of the height and width of the surface structure.

In an embodiment, in any combination with any of the above embodiments, the speaker comprising a second substantially electro-magnetic deformable plate element attached to the surface structure, wherein the first and the second electro-magnetic deformable plate elements are placed in opposite corners of the surface structure so that they do not overlap with each other.

In an embodiment, in any combination with any of the above embodiments, wherein the band-pass filter of the second electro-magnetic deformable plate element comprises multiple pass-bands providing frequency selectivity of the second electro-magnetic deformable plate element.

In an embodiment, in any combination with any of the above embodiments, the band-pass filter of the second electro-magnetic deformable plate element comprises a selectively 90 degree phase-shifting all-pass filter enabling to use the second electro-magnetic deformable plate element with most frequencies.

In an embodiment, in any combination with any of the above embodiments, the electro-magnetic deformable plate elements arranged in a form of a matrix.

In an embodiment, in any combination with any of the above embodiments, the surface structure comprises a display structure.

In an embodiment, in any combination with any of the above embodiments, the electro-magnetic deformable plate element is a piezoelectric deformable plate element.

In an embodiment, in any combination with any of the above embodiments, the surface structure is a substantially rigid and planar surface structure.

According to another aspect, there is provided an electronic apparatus comprising a body, a display structure rigidly attached to the body, and at least one electro-magnetic deformable plate element attached to the display structure and configured to bend the display structure when driven with a voltage or current source, wherein the at least one electro-magnetic deformable plate element is sized and placed to utilize multiple vibrational modes of the display structure.

In an embodiment, the electronic apparatus comprises a first substantially rectangular electro-magnetic deformable element attached to the display structure, wherein the first electro-magnetic deformable plate element is placed in a corner of the display structure so that at least part of the first electro-magnetic deformable plate element exceeds a center point of the display structure.

In an embodiment, in any combination with any of the above embodiments, the electronic apparatus comprises a second substantially electro-magnetic deformable plate element attached to the display structure, wherein the first and the second electro-magnetic deformable plate elements are placed in opposite corners of the display structure so that they do not overlap with each other.

In an embodiment, in any combination with any of the above embodiments, the electronic apparatus comprises one of a band-pass filter comprising multiple pass-bands providing frequency selectivity of the second electro-magnetic deformable plate element, or a selectively 90 degree phase-shifting all-pass filter enabling to use the second electro-magnetic deformable plate element with most frequencies.

In an embodiment, in any combination with any of the above embodiments, the electronic apparatus comprises a plurality of electro-magnetic deformable plate elements arranged in a form of a matrix.

In an embodiment, in any combination with any of the above embodiments, the electro-magnetic deformable plate element is a piezoelectric deformable plate element.

According to another aspect, there is provided an electronic apparatus comprising a body, a display structure rigidly attached to the body, electro-magnetic deformable plate elements attached to the display structure and configured to bend the display structure when driven with a voltage or current source, and an electro-magnetic deformable plate element specific band-pass filter for at least one electro-magnetic deformable plate element of the electro-magnetic deformable plate elements, the band-pass filter having at least one electro-magnetic deformable plate element specific pass band.

In an embodiment, the electronic apparatus comprises a band-pass filter separately for each electro-magnetic deformable plate element of the electro-magnetic deformable plate elements, each band-pass filter having electro-magnetic deformable plate element specific pass band.

In an embodiment, in any combination with any of the above embodiments, the electro-magnetic deformable plate elements are sized and placed to utilize multiple vibrational modes of the display structure.

In an embodiment, in any combination with any of the above embodiments, wherein the electronic apparatus comprises a first substantially rectangular electro-magnetic deformable element attached to the display structure, wherein the first electro-magnetic deformable plate element is placed in a corner of the display structure so that at least part of the first electro-magnetic deformable plate element exceeds a center point of the display structure.

In an embodiment, in any combination with any of the above embodiments, the size of the first electro-magnetic deformable plate element is approximately three fifths of the height and width of the display structure.

In an embodiment, in any combination with any of the above embodiments, wherein the electronic apparatus comprises a second substantially electro-magnetic deformable plate element attached to the display structure, wherein the first and the second electro-magnetic deformable plate elements are placed in opposite corners of the display structure so that they do not overlap with each other.

In an embodiment, in any combination with any of the above embodiments, the band-pass filter of the second electro-magnetic deformable plate element comprises multiple pass-bands providing frequency selectivity of the second electro-magnetic deformable plate element.

In an embodiment, in any combination with any of the above embodiments, the band-pass filter of the second electro-magnetic deformable plate element comprises a selectively 90 degree phase-shifting all-pass filter enabling to use the second electro-magnetic deformable plate element with most frequencies.

In an embodiment, in any combination with any of the above embodiments, the electro-magnetic deformable plate elements arranged in a form of a matrix.

In an embodiment, in any combination with any of the above embodiments, the electro-magnetic deformable plate element is a piezoelectric deformable plate element.

According to an aspect, there is provided a method comprising inputting a series of audio frequencies to electro-magnetic deformable plate elements of the speaker, the speaker comprising a body, a surface structure rigidly attached to the body, and electro-magnetic deformable plate elements attached to the surface structure and configured to bend, when driven with a voltage or current source, the surface structure; measuring frequency response of the speaker to the input series of audio frequencies; and determining optimal pass-bands separately for each electro-magnetic deformable plate element based on the measurements.

According to another aspect, there is provided a computer program comprising program code, which when executed by at least one processor, causes an apparatus to input a series of audio frequencies to electro-magnetic deformable plate elements of the speaker, the speaker comprising a body, a surface structure rigidly attached to the body, and electro-magnetic deformable plate elements attached to the surface structure and configured to bend, when driven with a voltage or current source, the surface structure; measure frequency response of the speaker to the input series of audio frequencies; and determine optimal pass-bands separately for each electro-magnetic deformable plate element based on the measurements.

According to another aspect, there is provided a computer-readable medium comprising a computer program comprising program code, which when executed by at least one processor, causes an apparatus to input a series of audio frequencies to electro-magnetic deformable plate elements of the speaker, the speaker comprising a body, a surface structure rigidly attached to the body, and electro-magnetic deformable plate elements attached to the surface structure and configured to bend, when driven with a voltage or current source, the surface structure; measure frequency response of the speaker to the input series of audio frequencies; and determine optimal pass-bands separately for each electro-magnetic deformable plate element based on the measurements.

According to another aspect, there is provided a speaker comprising a body, a surface structure rigidly attached to the body, electro-magnetic deformable plate means attached to the surface structure and configured to bend, when driven with a voltage or current source, the surface structure, and an electro-magnetic deformable plate element specific band-pass filtering means for at least one electro-magnetic deformable plate means of the electro-magnetic deformable plate means, the band-pass filtering means having at least one electro-magnetic deformable plate means specific pass band.

According to another aspect, there is provided an electronic apparatus comprising a body, a display structure rigidly attached to the body, electro-magnetic deformable plate means attached to the display structure and configured to bend the display structure when driven with a voltage or current source, and an electro-magnetic deformable plate means specific band-pass filtering means for at least one electro-magnetic deformable plate means of the electro-magnetic deformable plate means, the band-pass filtering means having at least one electro-magnetic deformable plate means specific pass band.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller or a processor may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A speaker comprising:
   a body;
   a surface structure rigidly attached to the body;
   electro-magnetic deformable plate elements attached to the surface structure and configured to bend, when driven with a voltage or current source, the surface structure, at least one of the electro-magnetic deformable plate elements comprising a first substantially rectangular electro-magnetic deformable element attached to the surface structure, wherein the first substantially rectangular electro-magnetic deformable plate element is placed in a corner of the surface structure and having at least a part thereof exceeding a center point of the surface structure; and
   an electro-magnetic deformable plate element specific band-pass filter for at least one electro-magnetic deformable plate element of the electro-magnetic deformable plate elements, the band-pass filter having at least one electro-magnetic deformable plate element specific pass band.

2. A speaker of claim 1, comprising a band-pass filter separately for each electro-magnetic deformable plate element of the electro-magnetic deformable plate elements, the band-pass filters configured to have electro-magnetic deformable plate element specific frequency pass bands for each of the electro-magnetic deformable plate elements and further configured to be selectively activated to excite natural vibrational modes near a fundamental frequency of each of the electro-magnetic deformable plate elements.

3. A speaker of claim 1, wherein the electro-magnetic deformable plate elements are sized and placed to utilize multiple vibrational modes of the surface structure.

4. A speaker of claim 1, wherein the first substantially rectangular electro-magnetic deformable plate element covers less than an entirety of the surface structure.

5. A speaker of claim 1, wherein the size of the first electro-magnetic deformable plate element is approximately three fifths of the height and width of the surface structure.

6. A speaker of claim 1, comprising a second substantially electro-magnetic deformable plate element attached to the surface structure, wherein the first and the second electro-magnetic deformable plate elements are placed in opposite corners of the surface structure so that they do not overlap with each other.

7. A speaker of claim 6, wherein the band-pass filter of the second electro-magnetic deformable plate element comprises multiple pass-bands providing frequency selectivity of the second electro-magnetic deformable plate element.

8. A speaker of claim 6, wherein the band-pass filter of the second electro-magnetic deformable plate element comprises a selectively 90 degree phase-shifting all-pass filter enabling to use the second electro-magnetic deformable plate element with most frequencies.

9. A speaker of claim 1, wherein the electro-magnetic deformable plate elements are arranged in a form of a matrix.

10. A speaker of claim 1, wherein the surface structure comprises a display structure.

11. A speaker of claim 1, wherein the electro-magnetic deformable plate elements are piezoelectric deformable plate elements.

12. A speaker of claim 1, wherein the surface structure is a substantially rigid and planar surface structure.

13. An electronic apparatus comprising:
   a body;
   a display structure rigidly attached to the body;
   electro-magnetic deformable plate elements attached to the display structure and configured to bend the display structure when driven with a voltage or current source, at least one of the electro-magnetic deformable plate elements comprising a first substantially rectangular electro-magnetic deformable element attached to the display structure, wherein the first substantially rectangular electro-magnetic deformable plate element is placed in a corner of the display structure and having at least a part thereof exceeding a center point of the display structure; and
   an electro-magnetic deformable plate element specific band-pass filter for at least one electro-magnetic deformable plate element of the electro-magnetic deformable plate elements, the band-pass filter having at least one electro-magnetic deformable plate element specific pass band.

14. An electronic apparatus of claim 13, comprising a band-pass filter separately for each electro-magnetic deformable plate element of the electro-magnetic deformable plate elements, each band-pass filter having electro-magnetic deformable plate element specific pass band.

15. An electronic apparatus of claim 13, wherein the electro-magnetic deformable plate elements are sized and placed to utilize multiple vibrational modes of the display structure.

16. An electronic apparatus of claim 15, comprising a plurality of electro-magnetic deformable plate elements arranged in a form of a matrix.

17. An electronic apparatus of claim 13, wherein the first substantially rectangular electro-magnetic deformable plate element covers less than an entirety of the display structure.

18. An electronic apparatus of claim 17, comprising a second substantially electro-magnetic deformable plate element attached to the display structure, wherein the first and the second electro-magnetic deformable plate elements are placed in opposite corners of the display structure so that they do not overlap with each other.

19. An electronic apparatus of claim 18, wherein the band-pass filter of the second electro-magnetic deformable plate element comprises:
   a band-pass filter comprising multiple pass-bands providing frequency selectivity of the second electro-magnetic deformable plate element;
   a selectively 90 degree phase-shifting all-pass filter enabling to use the second electro-magnetic deformable plate element with most frequencies.

20. A method comprising:
   inputting a series of audio frequencies to electro-magnetic deformable plate elements of the speaker, the speaker comprising a body, a surface structure rigidly attached to the body, and electro-magnetic deformable plate elements attached to the surface structure and configured to bend, when driven with a voltage or current source, the surface structure, at least one of the electro-magnetic deformable plate elements comprising a first substantially rectangular electro-magnetic deformable element attached to the surface structure, wherein the first substantially rectangular electro-magnetic deformable plate element is placed in a corner of the surface structure and having at least a part thereof exceeding a center point of the surface structure;
   measuring frequency response of the speaker to the input series of audio frequencies; and
   determining optimal pass-bands separately for each electro-magnetic deformable plate element based on the measurements.

* * * * *